United States Patent
Lee et al.

(10) Patent No.: US 10,713,439 B2
(45) Date of Patent: Jul. 14, 2020

(54) APPARATUS AND METHOD FOR GENERATING SENTENCE

(71) Applicant: Samsung Electronics Co., Ltd., Suwon-si (KR)

(72) Inventors: Hoshik Lee, Seongnam-si (KR); Hwidong Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 15/471,573

(22) Filed: Mar. 28, 2017

(65) Prior Publication Data

US 2018/0121419 A1     May 3, 2018

(30) Foreign Application Priority Data

Oct. 31, 2016  (KR) .................. 10-2016-0143432

(51) Int. Cl.
*G06F 40/30* (2020.01)
*G06N 3/08* (2006.01)
*G06N 3/04* (2006.01)
*G06F 40/56* (2020.01)
*G06F 40/247* (2020.01)

(52) U.S. Cl.
CPC .......... *G06F 40/30* (2020.01); *G06F 40/247* (2020.01); *G06F 40/56* (2020.01); *G06N 3/0454* (2013.01); *G06N 3/08* (2013.01)

(58) Field of Classification Search
CPC .............. G06F 17/2785; G06F 17/277; G06F 17/30654; G06F 17/279
See application file for complete search history.

(56) References Cited

U.S. PATENT DOCUMENTS

| | | | |
|---|---|---|---|
| 7,013,264 B2* | 3/2006 | Dolan | ............... G06F 17/30684 704/9 |
| 7,412,385 B2 | 8/2008 | Brockett et al. | |
| 7,584,092 B2* | 9/2009 | Brockett | ................ G06F 17/27 704/1 |
| 8,484,022 B1 | 7/2013 | Vanhoucke | |
| 8,918,309 B2 | 12/2014 | Tuganbaev et al. | |
| 9,037,449 B2 | 5/2015 | Kim et al. | |
| 9,336,192 B1* | 5/2016 | Barba | ................... G06F 17/277 |

(Continued)

FOREIGN PATENT DOCUMENTS

| KR | 10-1194635 B1 | 10/2012 |
|---|---|---|
| KR | 10-2015-0014236 A | 2/2015 |

OTHER PUBLICATIONS

Socher, Richard, et al. "Dynamic pooling and unfolding recursive autoencoders for paraphrase detection." Advances in neural information processing systems. 2011.*

(Continued)

*Primary Examiner* — Matthew H Baker
(74) *Attorney, Agent, or Firm* — NSIP Law

(57) ABSTRACT

A sentence generating apparatus includes an encoder configured to generate a first sentence embedding vector by applying trained result data to a first paraphrased sentence of an input sentence, an extractor configured to extract verification sentences in a preset range from the generated first sentence embedding vector, and a determiner configured to determine a similarity of the first paraphrased sentence to the input sentence based on comparing the verification sentences to the input sentence.

25 Claims, 8 Drawing Sheets

(56) References Cited

U.S. PATENT DOCUMENTS

| | | | |
|---|---|---|---|
| 9,672,814 B2* | 6/2017 | Cao | G10L 15/063 |
| 2009/0119090 A1* | 5/2009 | Niu | G06F 17/24 |
| | | | 704/1 |
| 2010/0010803 A1* | 1/2010 | Ishikawa | G06F 17/2795 |
| | | | 704/9 |
| 2012/0016678 A1 | 1/2012 | Gruber et al. | |
| 2013/0103382 A1* | 4/2013 | Kim | G06F 17/2827 |
| | | | 704/2 |
| 2014/0006012 A1 | 1/2014 | Zhou et al. | |
| 2015/0356401 A1 | 12/2015 | Vinyals et al. | |
| 2016/0092437 A1 | 3/2016 | Endo et al. | |
| 2016/0140958 A1 | 5/2016 | Heo et al. | |
| 2017/0220561 A1* | 8/2017 | Fujiwara | G06F 17/2827 |
| 2018/0089180 A1* | 3/2018 | Imade | G06F 17/271 |

OTHER PUBLICATIONS

Zhang, Yu, et al. "Phrasal paraphrase based question reformulation for archived question retrieval." PloS one 8.6 (2013): e64601.*

Kiros, Ryan, et al. "Skip-thought vectors." Advances in neural information processing systems. 2015.*

He, Hua, Kevin Gimpel, and Jimmy Lin. "Multi-perspective sentence similarity modeling with convolutional neural networks." Proceedings of the 2015 Conference on Empirical Methods in Natural Language Processing. 2015.*

Zhang, Wei-Nan, et al. "A topic clustering approach to finding similar questions from large question and answer archives." PloS one 9.3 (2014): e71511.*

Bowman, Samuel R., et al. "Generating sentences from a continuous space." arXiv preprint arXiv:1511.06349 (2015).*

* cited by examiner

APPARATUS AND METHOD FOR GENERATING SENTENCE

CROSS-REFERENCE TO RELATED APPLICATION(S)

This application claims the benefit under 35 USC § 119(a) of Korean Patent Application No. 10-2016-0143432 filed on Oct. 31, 2016, in the Korean Intellectual Property Office, the entire disclosure of which is incorporated herein by reference for all purposes.

BACKGROUND

1. Field

The following description relates to apparatus and method for generating a sentence.

2. Description of Related Art

Due to wide use of machine learning-based machine translation, users around the globe may receive contents produced in various languages. Thus, interpretation and translation technology that supports communication among users using different languages and translate contents produced in various languages has been developed.

In a case of human translation, a sentence may be translated into various forms, having similar meaning, depending on the translator. Whereas, for machine translation, each word or phrase in a sentence may be replaced with another similar word or phrase based on a sentence pair provided as training data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a sentence generating apparatus including a processor including an encoder configured to generate a first sentence embedding vector by applying trained result data to a first paraphrased sentence of an input sentence, an extractor configured to extract, from the generated first sentence embedding vector, verification sentences in a first range, and a determiner configured to determine a similarity of the first paraphrased sentence to the input sentence based on comparing the extracted verification sentences to the input sentence.

The determiner may be configured to output the first paraphrased sentence as a similar sentence of the input sentence, in response to the input sentence being determined to be among the verification sentences.

The extractor may be configured to extract verification sentences in a second range expanded from the first range, in response to a number of the verification sentences in the first range being less than or equal to a threshold.

The encoder may be configured to generate a second sentence embedding vector by applying the trained result data to the input sentence.

The extractor may be configured to extract a second paraphrased sentence based on the second sentence embedding vector, in response to the input sentence being determined to be absent from the verification sentences.

The extractor may be configured to extract other verification sentences corresponding to the second paraphrased sentence, and the determiner may be configured to determine a similarity of the second paraphrased sentence to the input sentence based on comparing the other verification sentences to the input sentence.

The first sentence embedding vector may include compressed information indicating semantic information of the input sentence.

The each of the first range and the second range comprise a beam width indicating a probability range of a word corresponding to each parameter in a sentence embedding vector.

The processor may be configured to temporarily implement any one or any combination of the encoder, the extractor, and the determiner.

In another general aspect, there is provided a sentence generating apparatus including a processor including an encoder configured to generate a first sentence embedding vector by applying trained result data to an input sentence, and a calculator configured to calculate a paraphrased first sentence embedding vector using a first noise vector of a dimension determined based on the first sentence embedding vector.

The calculator may be configured to randomly extract the first noise vector from a vector space in a preset range.

The processor may include an extractor configured to extract a paraphrased sentence of the input sentence by applying the trained result data to the paraphrased first sentence embedding vector, and wherein the encoder may be configured to generate a second sentence embedding vector of the paraphrased sentence.

The extractor may be configured to extract verification sentences from the second sentence embedding vector to determine a similarity of the paraphrased sentence to the input sentence.

The calculator may be configured to calculate the paraphrased first sentence embedding vector by combining the first sentence embedding vector and the first noise vector.

The vector space may include one or more parameters indicating semantic information of the input sentence.

In another general aspect, there is provided a sentence generating method including generating a first sentence embedding vector by applying trained result data to a first paraphrased sentence of an input sentence, extracting verification sentences in a first range from the first sentence embedding vector, and determining a similarity of the first paraphrased sentence to the input sentence based on comparing the verification sentences to the input sentence.

The determining of the similarity of the first paraphrased sentence may include outputting the first paraphrased sentence as a similar sentence of the input sentence, in response to the input sentence being determined to be among the verification sentences.

The extracting of the verification sentences may include extracting a verification sentences in a second range expanded from the first range, in response to a number of verification sentences in the first range being less than or equal to a threshold value.

The sentence generating method may include generating a second sentence embedding vector by applying the trained result data to the input sentence, wherein the determining of the similarity of the first paraphrased sentence may include extracting a second paraphrased sentence based on the second sentence embedding vector, in response to the input sentence being determined to be absent from the verification sentences.

The determining of the similarity of the first paraphrased sentence may include extracting other verification sentences corresponding to the second paraphrased sentence, and determining a similarity of the second paraphrased sentence to the input sentence based on comparing the other extracted verification sentences to the input sentence.

In another general aspect, there is provided a sentence generating device including an antenna, a cellular radio configured to transmit and receive data via the antenna according to a cellular communications standard, a touch-sensitive display, a memory configured to store instructions, and a processor configured to receive an input sentence through any one or any combination of the touch-sensitive display or the cellular radio, to generate a first sentence embedding vector by applying trained result data to a first paraphrased sentence of the input sentence, to extract verification sentences in a first range from the generated first sentence embedding vector, and to determine a similarity of the first paraphrased sentence to the input sentence based on comparing the extracted verification sentences to the input sentence.

Other features and aspects will be apparent from the following detailed description, the drawings, and the claims.

Figure 1:
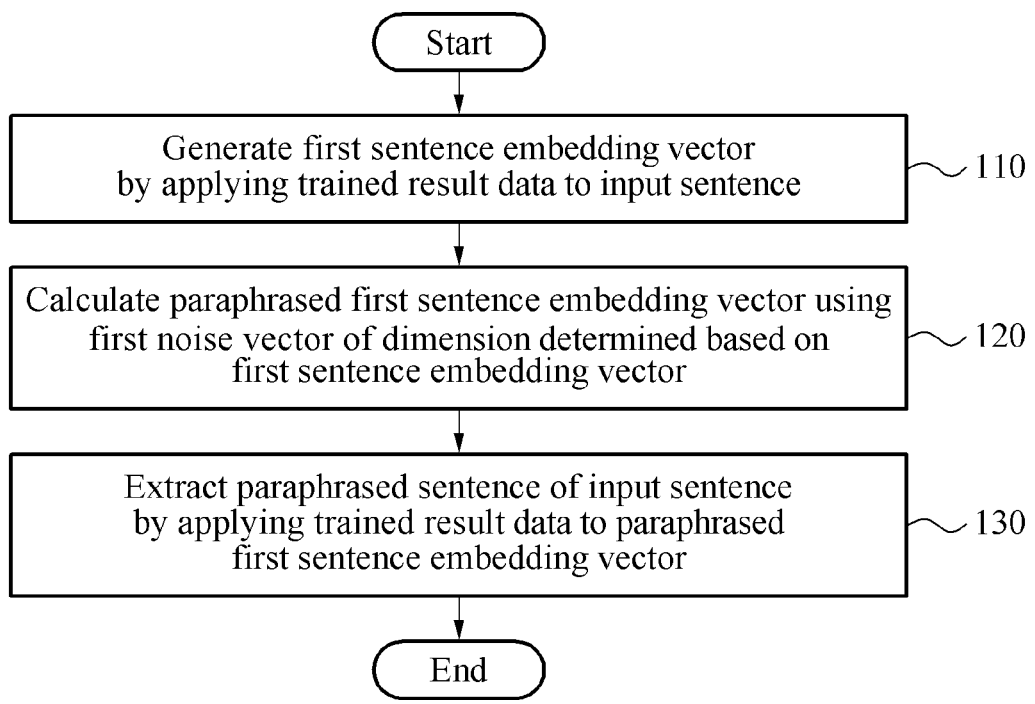
FIG. 1 is a diagram illustrating an example of a sentence generating method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

As a non-exhaustive illustration only, the sentence generating apparatus and method to generate a similar sentence of an input sentence that is paraphrased may be embedded in or interoperate with various digital devices such as, for example, an intelligent agent, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, other consumer electronics/information technology (CE/IT) device, or any other device capable of wireless communication or network communication consistent with that disclosed herein or various other Internet of Things (IoT) devices that are controlled through a network. The digital devices may be implemented in a smart appliance, an intelligent vehicle, an apparatus for automatic driving, a smart home environment, a smart building environment, a smart office environment, office automation, and a smart electronic secretary system. In addition, the sentence generating apparatus and method to generate a similar sentence of an input sentence that is paraphrased may be applied to provide machine translation to a client computer in a cloud network-based server.

The digital devices may also be implemented as a wearable device, which is worn on a body of a user. In one example, a wearable device may be self-mountable on the body of the user, such as, for example, a ring, a watch, a pair of glasses, glasses-type device, a bracelet, an ankle bracket, a belt, a band, an anklet, a belt necklace, an earring, a headband, a helmet, a device embedded in the cloths, or as an eye glass display (EGD), which includes one-eyed glass or two-eyed glasses.

FIG. 1 is a diagram illustrating an example of a sentence generating method. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer that perform the specified functions, or combinations of special purpose hardware and computer instructions.

Referring to FIG. 1, in 110, a sentence generating apparatus generates a first sentence embedding vector by applying trained result data to an input sentence. A sentence embedding vector refers to compressed information indicating semantic information of an input sentence. The sentence generating apparatus may perform machine learning based on training data that is input or stored in advance, and generate the result data. In an example, the training data is a sentence pair including an original sentence and a translated sentence, but other training data are considered to be well within the scope of the present disclosure. In an example, the trained result data refers to a vector space matching the input sentence and the semantic information of the input sentence. The vector space refers to a space defined as at least one parameter or weight that may match one word in the input sentence to the semantic information. In another example, the trained result data indicates a number of hidden nodes between a node to which the input sentence is input and a node from which the sentence embedding vector is output in a neural network, and a weight that connects nodes. The first sentence embedding vector may correspond to one location in the vector space defining the semantic information of the input sentence. A process of generating result data to be used by the sentence generating apparatus will be described later.

In 120, the sentence generating apparatus generates a first noise vector of a dimension determined based on the first sentence embedding vector generated in 110. For example, the first noise vector may be a vector having a same dimension as the first sentence embedding vector. In addition, the sentence generating apparatus calculates a paraphrased first sentence embedding vector using the first sentence embedding vector and the first noise vector.

In 130, the sentence generating apparatus extracts a paraphrased sentence of the input sentence by applying the trained result data to the paraphrased first sentence embedding vector. The sentence generating apparatus may restore the paraphrased sentence corresponding to the paraphrased first sentence embedding vector. The sentence generating apparatus may decode the paraphrased sentence by applying, to the paraphrased first sentence embedding vector, the result data used to generate the first sentence embedding vector.

Detailed operations performed by the sentence generating apparatus to generate a sentence embedding vector by receiving an input sentence and encoding the input sentence to a vector space indicating semantic information of the input sentence will be described below.

Figure 2:
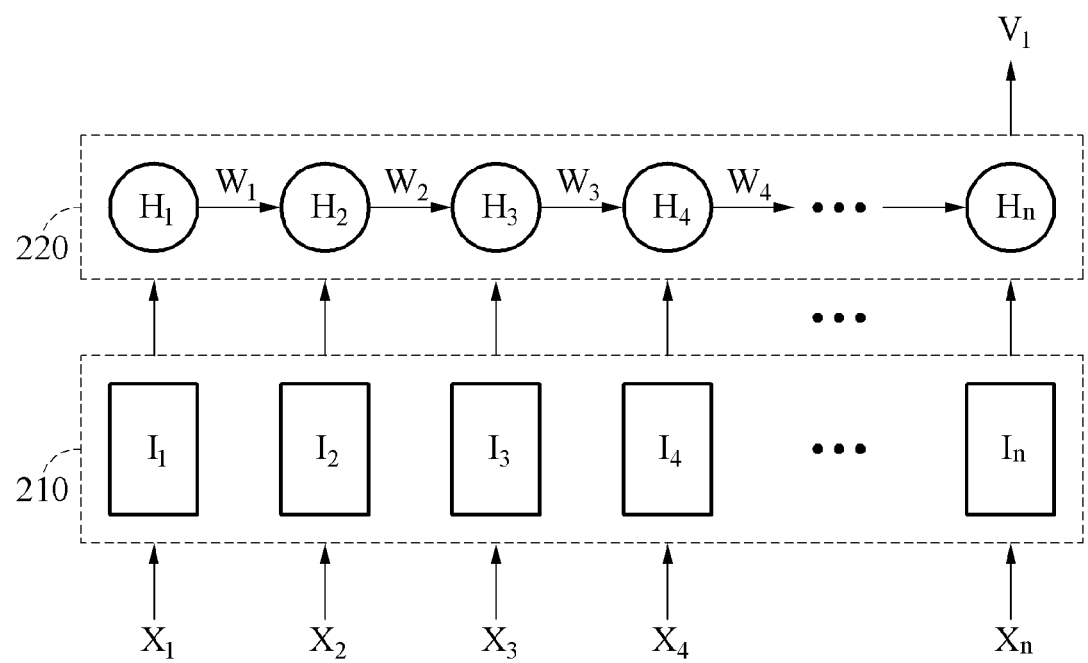
FIG. 2 is a diagram illustrating an example of a process of generating a sentence embedding vector by a sentence generating apparatus.

FIG. 2 is a diagram illustrating an example of a process of generating a sentence embedding vector by a sentence generating apparatus.

FIG. 2 illustrates a connection between an input node layer 210 and a hidden node layer 220 to be embodied by the sentence generating apparatus. Referring to the example of FIG. 2, the sentence generating apparatus generates the input node layer 210 and the hidden node layer 220 through machine learning using a neural network. The connection between the input node layer 210 and the hidden node layer 220 and a weight associated with the connection are provided only as an illustrative example, and not be construed as limiting a scope of other examples.

In an example, the sentence generating apparatus performs the machine learning using an autoencoder including an encoder configured to generate an embedding vector of input information based on mapping of input nodes and hidden nodes, and a decoder configured to restore output information from the generated embedding vector based on mapping of the hidden nodes and output nodes.

The sentence generating apparatus may perform the machine learning using a method of inputting a first sentence as the input information and outputting the first sentence and a previous sentence and a subsequence sentence of the first sentence as the output information. In an example, the sentence generating apparatus may perform the machine learning by combining, with an autoencoder method of outputting the first sentence itself, a skip-thought method of inputting the first sentence and outputting the previous sentence and the subsequent sentence of the first sentence as the output information. In another example, the sentence generating apparatus may perform the machine learning through a multi-task training method of inputting the first sentence as the input information and outputting the first sentence and a translated sentence of the first sentence as the output information.

As illustrated, each piece of sampling data included in the input sentence, for example, first sampling data $X_1$, second sampling data $X_2$, to the n-th sampling data $X_n$, is input to the input node layer 210. In an example, each piece of the sampling data may indicate one word in the input sentence. In another example, each piece of the sampling data may indicate a phrase in the input sentence that is distinguished from another phrase or word by spacing.

A first input node $I_1$ that is embodied by the sentence generating apparatus transfers the first sampling data $X_1$ to a first hidden node $H_1$. The first hidden node $H_1$ transfers, to a second hidden node $H_2$, a first weight $W_1$ calculated from the first sampling data $X_1$. The second hidden node $H_2$ calculates a second weight $W_2$ and transfers the calculated second weight $W_2$ to a third hidden node $H_3$. The second weight $W_2$ is based on the second sampling data $X_2$ input to a second input node $I_2$ and the first weight $W_1$ associated with the first sampling data $X_1$. Thus, a plurality of weights associated with a plurality of pieces of sampling data corresponding to an input sentence may be calculated. When the n-th sampling data $X_n$ indicating an end of statement (EOS) is input, an n-th hidden node $H_n$ generates a sentence embedding vector $V_1$ indicating semantic information of the input sentence using an n−1 th weight $W_{n-1}$ including information on previous pieces of the sampling data and the n-th sampling data $X_n$. The generated sentence embedding vector $V_1$ may be used by the sentence generating apparatus to generate a paraphrased sentence having a similar meaning to the input sentence.

Figure 3:
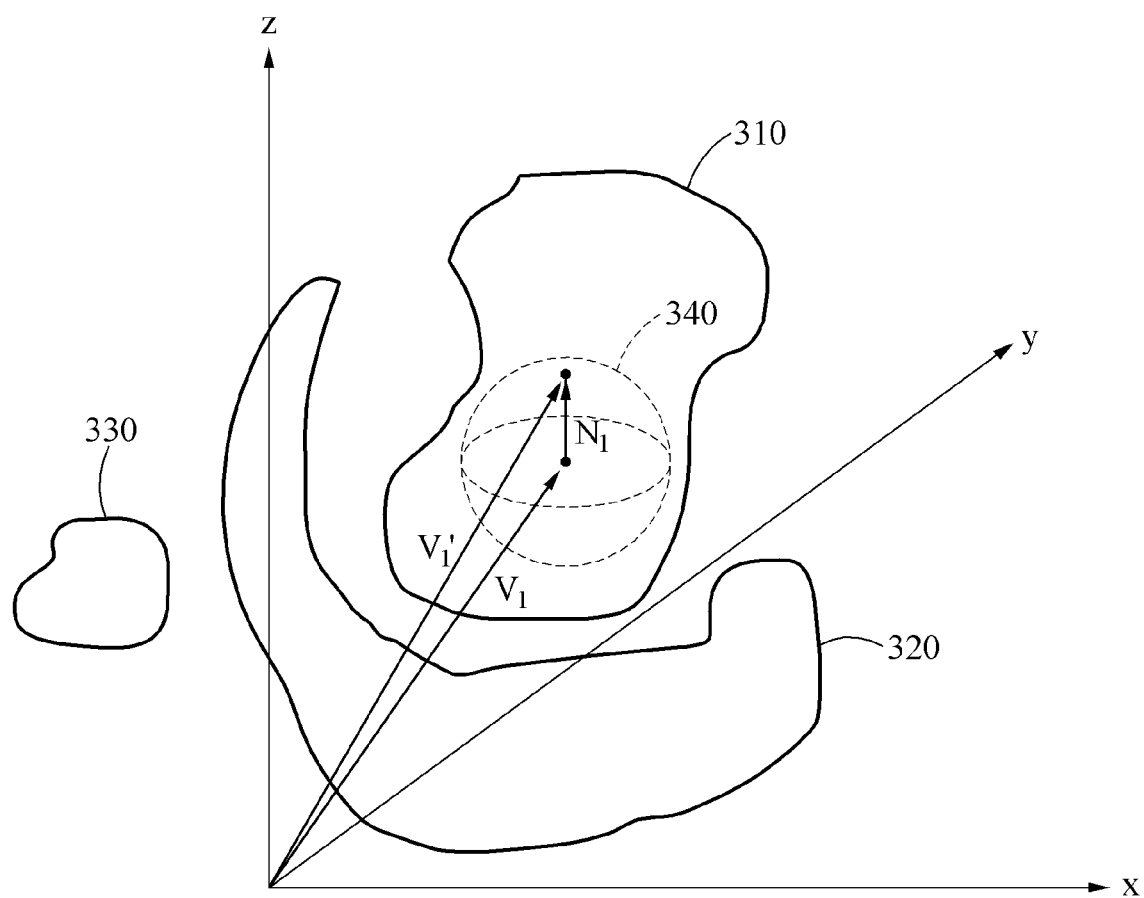
FIG. 3 is a diagram illustrating an example of a process of generating a paraphrased sentence embedding vector by a sentence generating apparatus.

FIG. 3 is a diagram illustrating an example of a process of generating a paraphrased sentence embedding vector by a sentence generating apparatus.

FIG. 3 illustrates a three-dimensional (3D) vector space corresponding to a sentence embedding vector. Referring to the example of FIG. 3, three spaces, for example, a first space 310, a second space 320, and a third space 330, that include sentence embedding vectors indicating semantically same sentences are present in the 3D vector space. For example, the first space 310 may include sentence embedding vectors corresponding to a meaning of a sentence "I am going to work." The second space 320 may include sentence embedding vectors corresponding to a meaning of a sentence "I am going to school." The third space 330 may include sentence embedding vectors corresponding to a meaning of a sentence "I want to eat an apple." The 3D vector space refers to a space defined as three parameters indicating semantic information of an input sentence. A 3D space defined as three parameters is illustrated in FIG. 3 for convenience of description, but different numbers of are parameters or dimensions of a vector space are considered to be well within the scope of the present disclosure. For example, the sentence generating apparatus may generate a sentence embedding vector corresponding to a vector space of an n dimension, where n is defined as an integer greater than or equal to zero.

The sentence generating apparatus generates a first sentence embedding vector $V_1$ by applying trained result data to an input sentence. As described above, the result data refers to a result of machine learning performed using training data stored in advance based on a structure of an autoencoder. In an example, the training data includes an input node and a hidden node that connect the input sentence and semantic information, a connection between the nodes, and a weight corresponding to the connection.

In an example, the sentence generating apparatus extracts a first noise vector $N_1$ present in a range 340 preset based on the first sentence embedding vector $V_1$. The preset range 340 may be defined as a 3D spherical form present within a size ε preset based on the first sentence embedding vector $V_1$. The sentence generating apparatus calculates a paraphrased first sentence embedding vector $V_1'$ using the extracted first noise vector $N_1$ and the first sentence embedding vector $V_1$.

The paraphrased first sentence embedding vector $V_1'$ refers to an embedding vector corresponding to a paraphrased sentence. The paraphrased sentence is another sentence different from the input sentence corresponding to the first sentence embedding vector $V_1$ and has same semantic information as the input sentence. Thus, the sentence generating apparatus may provide a translating apparatus with various similar sentences to be used for machine translation. For example, when an input sentence corresponding to the first sentence embedding vector $V_1$ is "I am going to work," the paraphrased first sentence embedding vector $V_1'$ may indicate a paraphrased sentence "I am on my way to work," which is semantically same as the input sentence. A detailed process of restoring a paraphrased sentence from a paraphrased sentence embedding vector and determining a similarity of the paraphrased sentence to an input sentence will be described below.

Figure 4:
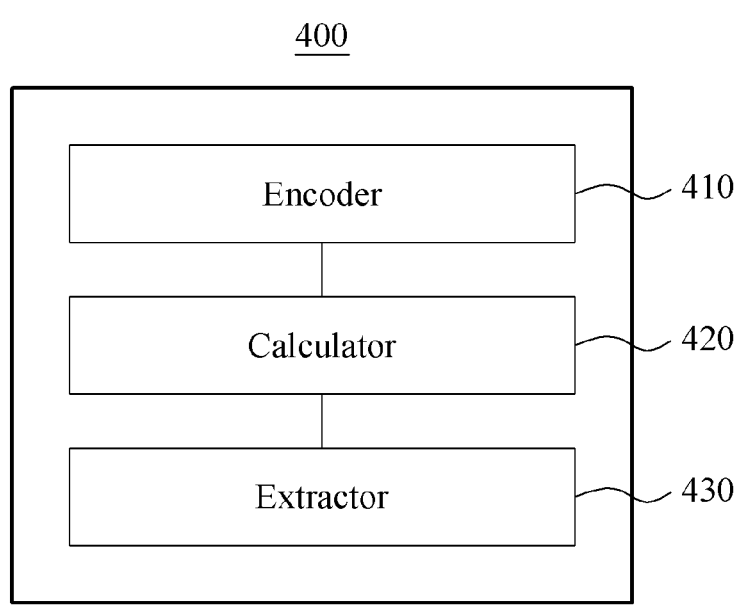
FIG. 4 is a diagram illustrating an example of a sentence generating apparatus.

FIG. 4 is a diagram illustrating an example of a sentence generating apparatus 400.

The sentence generating apparatus 400 may generate a sentence embedding vector indicating semantic information of an input sentence, and output a similar sentence of the input sentence that is paraphrased from the input sentence based on a paraphrased sentence embedding vector generated by changing the sentence embedding vector.

Referring to FIG. 4, the sentence generating apparatus 400 includes an encoder 410, a calculator 420, and an extractor 430. The sentence generating apparatus 400 includes at least one processor, and may be implemented by the processor.

The encoder 410 generates a first sentence embedding vector by applying trained result data to an input sentence. In an example, the encoder 410 is embodied as an encoder included in a neural network-based autoencoder. The encoder 410 generates the first sentence embedding vector using an input node layer and a hidden node layer as the trained result data. The autoencoder may include a sequence-to-sequence autoencoder. The sequence-to-sequence autoencoder may be an encoder in the autoencoder. For example, in response to a first sequence being input to the encoder in the autoencoder, a second sequence may be output from a decoder in the autoencoder.

The encoder 410 inputs each piece of sampling data included in the input sentence to an input node of the input node layer. The encoder 410 generates the first sentence embedding vector corresponding to the input sentence based on a connection between the input node layer and the hidden node layer that are pretrained and on a weight associated with the connection.

The calculator 420 extracts a first noise vector corresponding to the first sentence embedding vector generated by the encoder 410. In an example, the first noise vector refers to a vector of a dimension determined based on the first sentence embedding vector. In an example, the calculator 420 randomly extracts the first noise vector from a vector space in a preset range. The range of the vector space used to extract the first noise vector may be defined as a coefficient correlated with a range in which a plurality of verification sentences is extracted.

In an example, the calculator 420 generates a paraphrased first sentence embedding vector using the first sentence embedding vector corresponding to the input sentence and the first noise vector. The calculator 420 calculates the paraphrased first sentence embedding vector by combining the first sentence embedding vector and the first noise vector.

The extractor 430 extracts a paraphrased sentence of the input sentence by applying the trained result data to the paraphrased first sentence embedding vector. For example, the extractor 430 may be embodied as a decoder included in a neural network-based autoencoder. The extractor 430 decodes the paraphrased sentence from the paraphrased first sentence embedding vector using, as prestored training data, a connection between the hidden node layer and an output node layer and a weight associated with the connection. In an example, the encoder 410 inputs, to an input node, the paraphrased sentence newly generated by the extractor 430, and generates a second sentence embedding vector corresponding to the paraphrased sentence. The extractor 430 extracts a plurality of verification sentences from the second sentence embedding vector, and the extracted verification sentences may be used to determine whether the paraphrased sentence is semantically same as the input sentence. A detailed process of determining whether a generated paraphrased sentence is semantically similar to an input sentence will be described below.

Figure 5:
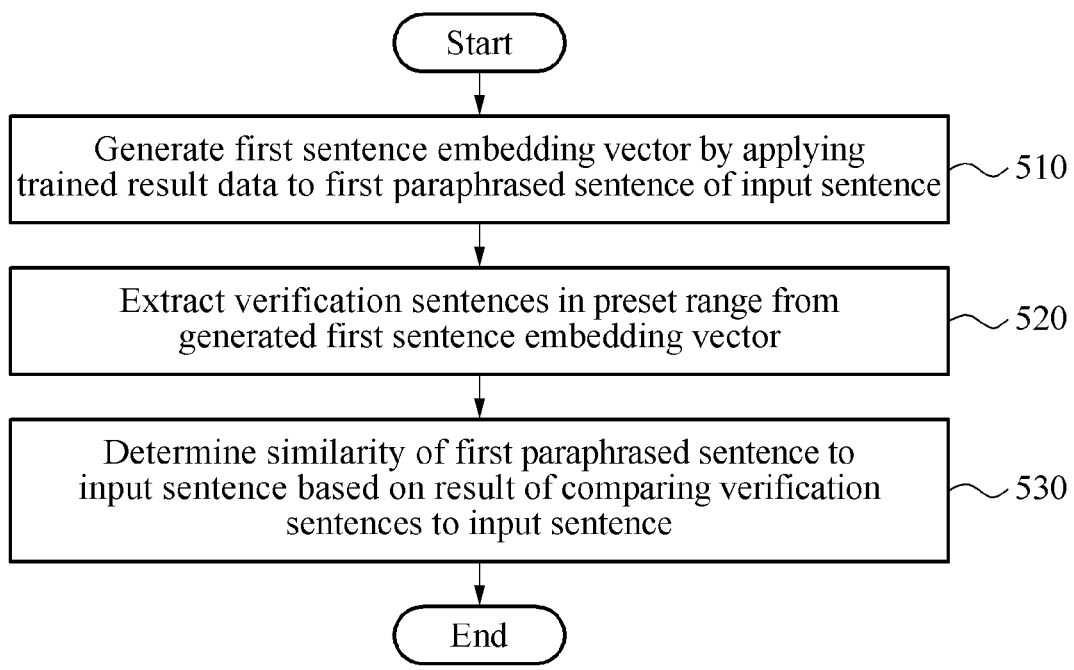
FIG. 5 is a diagram illustrating an example of a sentence generating method.

FIG. 5 is a diagram illustrating another example of a sentence generating method. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the above descriptions of FIGS. 1-4 is also applicable to FIG. 5, and are incorporated herein by reference. Thus, the above description may not be repeated here.

Referring to FIG. 5, in 510, a sentence generating apparatus generates a first sentence embedding vector by applying prestored training data to a first paraphrased sentence of an input sentence. The description of the encoder 410 provided with reference to FIG. 4 may be applicable to operation 510 performed by the sentence generating apparatus, and thus, the above descriptions of FIG. 4 are also applicable to FIG. 5, and are incorporated herein by reference. Thus, the above description may not be repeated here In 520, the sentence generating apparatus extracts a plurality of verification sentences in a preset range from the generated first sentence embedding vector. In an example, the sentence generating apparatus extracts the verification sentences using a decoder included in a neural network-based autoencoder. For example, the sentence generating apparatus may extract the verification sentences by outputting n sentences being in a close distance from the first sentence embedding vector. The sentence generating apparatus may extract the verification sentences by applying an N-best algorithm associated with the sentence generating method.

In 530, the sentence generating apparatus compares the extracted verification sentences to the input sentence. The sentence generating apparatus determines a similarity of the first paraphrased sentence to the input sentence based on a result of comparing the verification sentences to the input sentence. The verification sentences refer to sentences restored from the first sentence embedding vector corresponding to the first paraphrased sentence. In response to the input sentence being among the verification sentences, the sentence generating apparatus determines the first paraphrased sentence to be a similar sentence of the input sentence and outputs the first paraphrased sentence.

In response to an input sentence being among a plurality of verification sentences in a range of sentences similar to a paraphrased sentence, the sentence generating apparatus may output the paraphrased sentence as a similar sentence of the input sentence, and thus reliability of a probability of the paraphrased sentence being in a semantically similar range of the input sentence may be improved.

Figure 6:
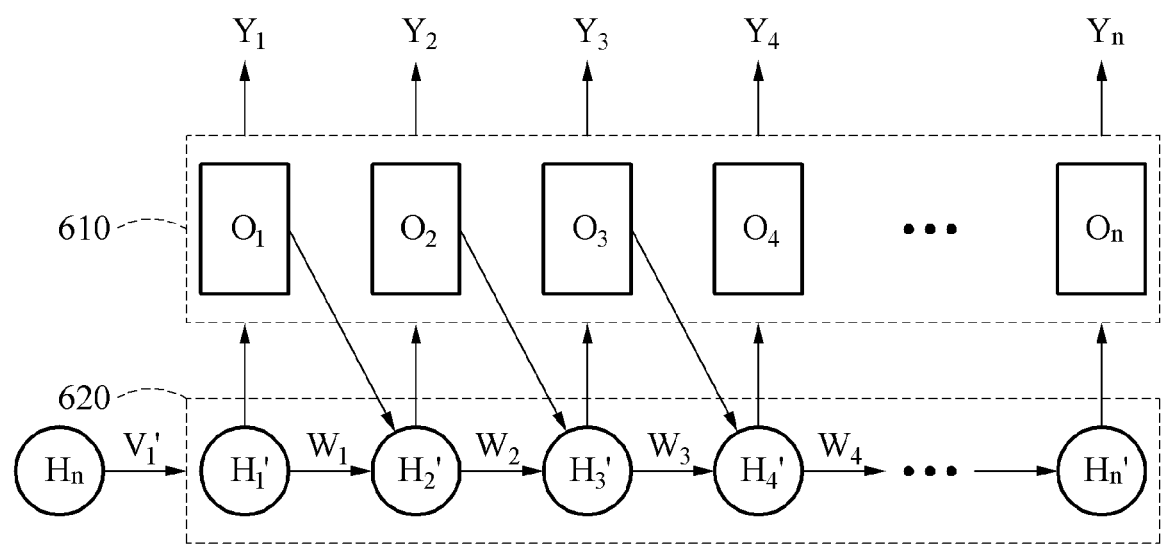
FIG. 6 is a diagram illustrating an example of a process of generating a paraphrased sentence by a sentence generating apparatus.

FIG. 6 is a diagram illustrating an example of a process of generating a paraphrased sentence by a sentence generating apparatus.

FIG. 6 illustrates a connection between an output node layer 610 and a hidden node layer 620 to be embodied by a sentence generating apparatus. Similarly to a configuration of an encoder described with reference to FIG. 2, the sentence generating apparatus may generate the output node layer 610 and the hidden node layer 620 from machine learning using a neural network.

In an example, the sentence generating apparatus includes an extractor configured to restore a paraphrased sentence as output information from a sentence embedding vector transferred based on mapping of hidden nodes and output nodes. The extractor may be embodied as a decoder included in a sequence-to-sequence autoencoder. The sentence generating apparatus may generate the decoder based on neural network-based machine learning. The description of training data provided with reference to FIG. 2 may be applicable here, and thus the above descriptions of FIG. 2 are also applicable to FIG. 6, and are incorporated herein by reference. Thus, the above description may not be repeated here.

Referring to FIG. 6, an n-th hidden node $H_n$ included in an encoder in an autoencoder of the sentence generating apparatus transfers, to a first hidden node $H_1'$ included in the extractor, a paraphrased first sentence embedding vector $V_1'$. The first hidden node $H_1'$ receiving the paraphrased first sentence embedding vector $V_1'$ outputs first sampling data $Y_1$ corresponding to a first output node $O_1$ based on prestored training data. The first output node $O_1$ transfers, to a second hidden node $H_2'$, the first sampling data $Y_1$ as output data of the first output node $O_1$. The second hidden node $H_2'$ outputs second sampling data $Y_2$ using a first weight $W_1$ transferred from the first hidden node $H_1'$ and the first sampling data $Y_1$ transferred from the first output node $O_1$. Similarly, in response to n-th sampling data $Y_n$ being output from an n-th output node $O_n$, the sentence generating apparatus obtains an entire sequence, for example, $Y_1+Y_2+Y_3+, \ldots, +Y_n$, of the paraphrased sentence corresponding to an entire sequence of the input sentence.

The sentence generating apparatus may generate a paraphrased sentence to be used as a similar sentence that is semantically similar to an input sentence based on a paraphrased sentence embedding vector using an encoder and a decoder in an autoencoder generated based on result data of machine learning obtained from stored or input training data.

Figure 7A:
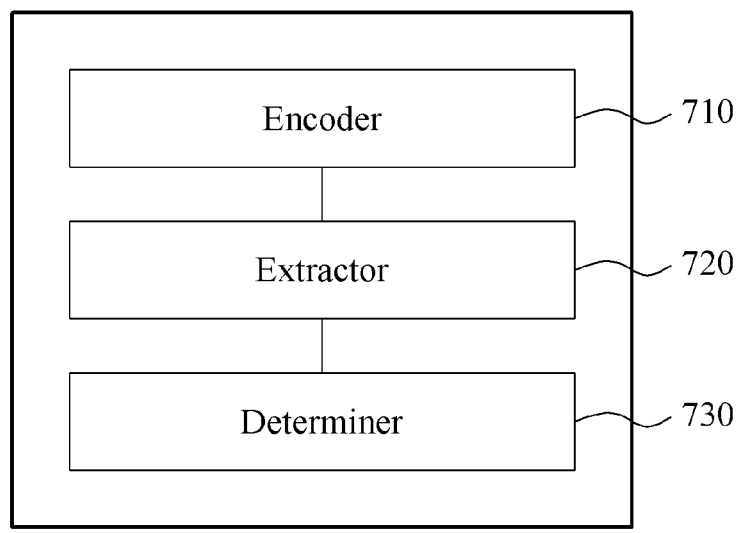
FIG. 7A is a diagram illustrating an example of a sentence generating apparatus.

FIG. 7A is a diagram illustrating an example of a sentence generating apparatus 700.

In an example, the sentence generating apparatus 700 generates a sentence embedding vector corresponding to a paraphrased sentence, and extracts a plurality of verification sentences from the generated sentence embedding vector to determine whether the paragraphed sentence is semantically similar to an input sentence. The sentence generating apparatus 700 may provide a user with a reliable paraphrased sentence by outputting the paraphrased sentence as a similar sentence of the input sentence based on a result of determining a similarity between each of the verification sentences and the input sentence.

Referring to FIG. 7A, the sentence generating apparatus 700 includes an encoder 710, an extractor 720, and a determiner 730. The sentence generating apparatus 700 includes at least one processor, and may be implemented by the processor.

The encoder 710 generates a first sentence embedding vector by applying trained result data to a first paraphrased sentence of an input sentence. For example, the encoder 710 may be embodied as an encoder in an autoencoder through neural network-based machine learning. In an example, the encoder 710 inputs each piece of sampling data of the first paraphrased sentence to an input node layer, and generates the first sentence embedding vector to be output from a hidden node layer.

The extractor 720 extracts a plurality of verification sentences in a preset range from the first sentence embedding vector. For example, the extractor 720 may be embodied as a decoder in the autoencoder through the neural network-based machine learning. The extractor 720 extracts the verification sentences being in a preset distance from the first sentence embedding vector through the machine learning. For example, the extractor 720 may extract the verification sentences including a first verification sentence closest to the first sentence embedding vector through an n-th verification sentence that is n-th closest to the first sentence embedding vector. In addition, the extractor 720 may extract the verification sentences based on an N-best algorithm. A detailed description of the N-best algorithm will be omitted for brevity.

In an example, when a number of verification sentences in a first range, the number being less than or equal to a threshold value, is extracted from the first sentence embedding vector, the extractor 720 may extract a plurality of verification sentences in a second range expanded from the first range. For example, the first range and the second range each may indicate a beam width indicating a probability range of a word corresponding to each of parameters in a sentence embedding vector.

The determiner 730 determines a similarity of the first paraphrased sentence to the input sentence based on a result of comparing the verification sentences extracted by the extractor 720 to the input sentence. A process of comparing verification sentences to an input sentence by the determiner 730 will be described below with reference to FIG. 7B.

Figure 7B:
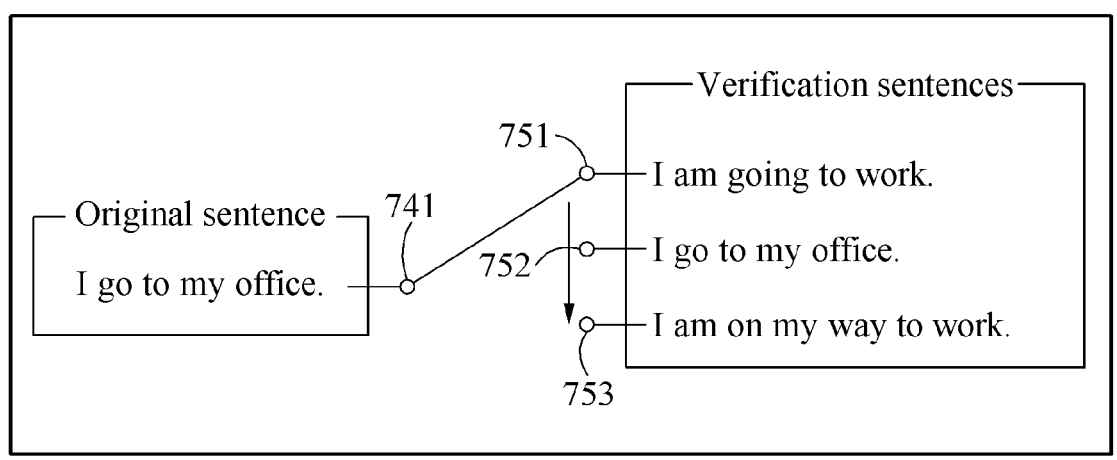
FIG. 7B is a diagram illustrating an example of a process of determining a similarity between a generated paraphrased sentence and an original sentence by a sentence generating apparatus.

FIG. 7B is a diagram illustrating an example of a process of determining a similarity between a generated paragraphed sentence and an original sentence by a sentence generating apparatus.

Referring to FIG. 7B, an original sentence 741 "I go to my office" is input to the sentence generating apparatus 700. The extractor 720 generates a paraphrased sentence "I go to work" (not shown) using a sentence embedding vector of the input sentence "I go to my office." In addition, the extractor 720 extracts a plurality of verification sentences using a sentence embedding vector of the paraphrased sentence "I go to work." The verification sentences may include, for example, a first verification sentence 751 "I am going to work," a second verification sentence 752 "I go to my office," and a third verification sentence 753 "I am on my way to work." The determiner 730 determines a similarity between each of the verification sentences 751, 752, and 753 and the original sentence 741 which is the input sentence, and thus determines a similarity between the original sentence 741 and the paraphrased sentence, "I go to work". Thus, the sentence generating apparatus 700 determines that the original sentence 741 and the second verification sentence 752 are the same sentences, and the determiner 730 outputs the paraphrased sentence "I go to work" as a similar sentence of the original sentence 741 "I go to my office."

Unlike the example illustrated in FIG. 7B, in the absence of verification sentences determined to be similar to the original sentence 741, the encoder 710 may generate a second sentence embedding vector by applying trained result data to the original sentence 741. The sentence generating apparatus 700 may generate a paraphrased second sentence embedding vector by newly combining a randomly extracted noise vector with the second sentence embedding vector. The extractor 720 may newly extract a second paraphrased sentence based on the paraphrased second sentence embedding vector. The foregoing description is also applicable to a process of determining a similarity between the newly extracted second paraphrased sentence and the original sentence 741, and thus a more detailed and repeated description will be omitted here for brevity.

Figure 8:
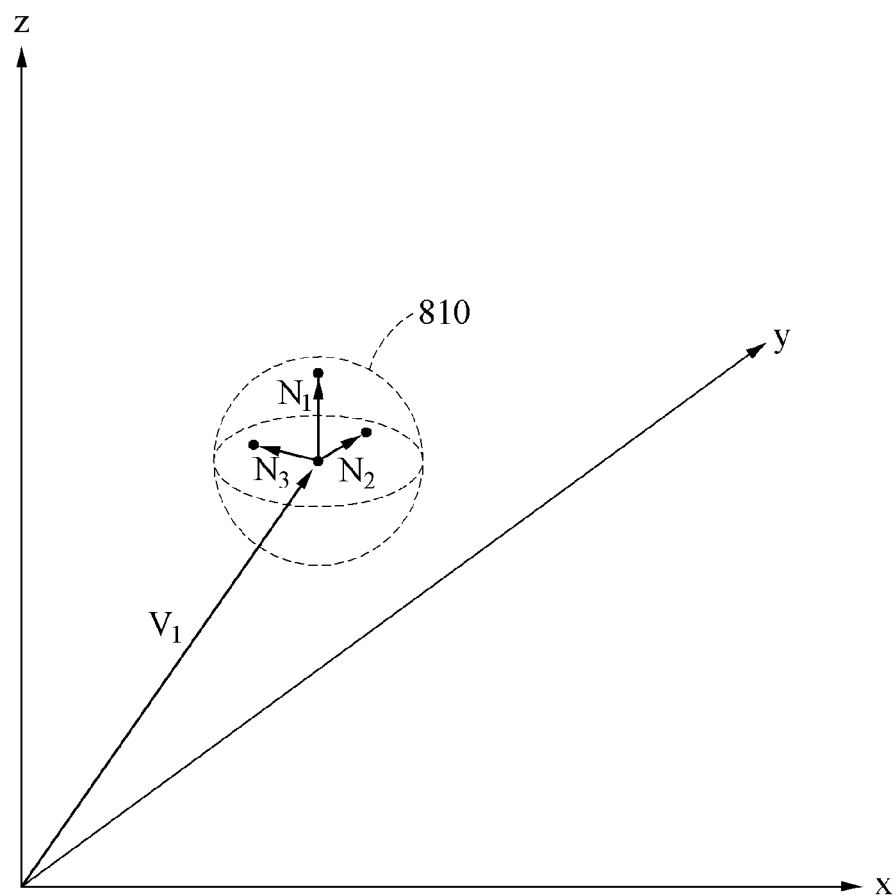
FIG. 8 is a diagram illustrating an example of a process of generating a new sentence embedding vector by a sentence generating apparatus.

FIG. 8 is a diagram illustrating an example of a process of generating a new sentence embedding vector by a sentence generating apparatus.

FIG. 8 illustrates a vector space indicating matching of a sentence and semantic information based on trained result data. Although a 3D vector space defined as three parameters is illustrated as an example, the example vector space is not construed as limiting a scope of other examples.

The sentence generating apparatus sets a range 810 centered at a first sentence embedding vector $V_1$ corresponding to an input sentence. The sentence generating apparatus randomly extracts a noise vector from the set range 810.

Unlike the example illustrated in FIG. 7B, a similarity of each of verification sentences to an input sentence may not be determined, and thus a similarity of a first paraphrased sentence to the input sentence may not be determined. In such a case, the sentence generating apparatus generates a newly paraphrased first sentence embedding vector using a second noise vector $N_2$ or a third noise vector $N_3$ in the range 810, excluding a first noise vector $N_1$ used to generated the first paraphrased sentence. The sentence generating apparatus re-extracts a new paraphrased sentence based on the newly paraphrased first sentence embedding vector. Although the range 810 is illustrated in a spherical 3D form having a distance from a center, the first sentence embedding vector $V_1$, such a form may not be construed as limiting a scope of other examples. For example, a noise vector may be extracted from a space in various forms centered at the first sentence embedding vector $V_1$, for example, a regular hexahedral space and a rectangular parallelepiped space.

The sentence generating apparatus 400, encoder 410, calculator 420, extractor 430, sentence generating apparatus 700, encoder 710, extractor 720, determiner 730 and other apparatuses, units, modules, devices, and other components illustrated in FIGS. 4 and 7A that perform the operations described herein with respect to FIGS. 1 and 5 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 and 5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sentence generating apparatus comprising:
a processor configured to:
   generate a first sentence embedding vector by applying a first paraphrased sentence to a machine learning model;
   extract, from the generated first sentence embedding vector, verification sentences in a first range;
   compare the extracted verification sentences to an input sentence to determine a similarity between the first paraphrased sentence and the input sentence; and
   selectively, based on a result of the determined similarity, output the first paraphrased sentence as a final paraphrased sentence similar to the input sentence.

2. The sentence generating apparatus of claim 1, wherein the processor is further configured to transform the input sentence into the first paraphrased sentence by applying a trained result data of the machine learning model to the input sentence.

3. The sentence generating apparatus of claim 1, further comprising a memory configured to store instructions;

wherein the processor is further configured to execute the instructions to configure the processor to:
  generate the first sentence embedding vector by applying the first paraphrased sentence to the machine learning model;
  extract, from the generated first sentence embedding vector, the verification sentences in the first range;
  compare the extracted verification sentences to the input sentence to determine the similarity between the first paraphrased sentence and the input sentence; and
  selectively, based on the result of the determined similarity, output the first paraphrased sentence as the final paraphrased sentence similar to the input sentence.

4. The sentence generating apparatus of claim 3, wherein the determiner is further configured to output the first paraphrased sentence as a similar sentence of the input sentence, in response to the input sentence being determined to be among the verification sentences.

5. The sentence generating apparatus of claim 3, wherein the extractor is further configured to extract verification sentences in a second range expanded from the first range, in response to a number of the verification sentences in the first range being less than or equal to a threshold.

6. The sentence generating apparatus of claim 5, wherein each of the first range and the second range comprise a beam width indicating a probability range of a word corresponding to each parameter in a sentence embedding vector.

7. The sentence generating apparatus of claim 3, wherein the encoder is further configured to generate a second sentence embedding vector by applying a trained result data of the machine learning model to the input sentence.

8. The sentence generating apparatus of claim 7, wherein the extractor is further configured to extract a second paraphrased sentence based on the second sentence embedding vector, in response to the input sentence being determined to be absent from the verification sentences.

9. The sentence generating apparatus of claim 8, wherein the extractor is further configured to extract other verification sentences corresponding to the second paraphrased sentence, and
  the determiner is further configured to determine a similarity of the second paraphrased sentence to the input sentence based on comparing the other verification sentences to the input sentence.

10. The sentence generating apparatus of claim 1, wherein the processor comprises:
  an encoder configured to generate the first sentence embedding vector by applying the first paraphrased sentence to the machine learning model;
  an extractor configured to extract, from the generated first sentence embedding vector, the verification sentences in the first range; and
  a determiner configured to compare the extracted verification sentences to the input sentence to determine the similarity between the first paraphrased sentence and the input sentence, and selectively, based on the result of the determined similarity, output the first paraphrased sentence as the final paraphrased sentence similar to the input sentence.

11. A sentence generating apparatus comprising:
a processor configured to:
  generate a first sentence embedding vector by applying a machine learning model to an input sentence;
  calculate a paraphrased first sentence embedding vector using a first noise vector of a dimension determined based on the first sentence embedding vector; and
  extract a paraphrased sentence of the input sentence by applying a trained result data of the machine learning model to the paraphrased first sentence embedding vector.

12. The sentence generating apparatus of claim 11, wherein the processor is further configured to transform the input sentence into the first paraphrased sentence by applying the trained result data of the machine learning model to the input sentence.

13. The sentence generating apparatus of claim 12, wherein the calculator is further configured to randomly extract the first noise vector from a vector space in a preset range.

14. The sentence generating apparatus of claim 12, wherein the encoder is further configured to generate a second sentence embedding vector of the paraphrased sentence.

15. The sentence generating apparatus of claim 14, wherein the extractor is further configured to extract verification sentences from the second sentence embedding vector to determine a similarity of the paraphrased sentence to the input sentence.

16. The sentence generating apparatus of claim 14, wherein the calculator is further configured to calculate the paraphrased first sentence embedding vector by combining the first sentence embedding vector and the first noise vector.

17. The sentence generating apparatus of claim 12, wherein the vector space comprises one or more parameters indicating semantic information of the input sentence.

18. The sentence generating apparatus of claim 11, further comprising a memory configured to store instructions;
  wherein the processor is further configured to execute the instructions to configure the processor to:
    generate the first sentence embedding vector by applying the machine learning model to the input sentence;
    calculate the paraphrased first sentence embedding vector using the first noise vector of the dimension determined based on the first sentence embedding vector; and
    extract the paraphrased sentence of the input sentence by applying the trained result data of the machine learning model to the paraphrased first sentence embedding vector.

19. The sentence generating apparatus of claim 11, wherein the processor comprises:
  an encoder configured to generate the first sentence embedding vector by applying the machine learning model to the input sentence;
  a calculator configured to calculate the paraphrased first sentence embedding vector using the first noise vector of the dimension determined based on the first sentence embedding vector; and
  an extractor configured to extract the paraphrased sentence of the input sentence by applying the trained result data of the machine learning model to the paraphrased first sentence embedding vector.

20. A sentence generating method comprising:
  generating a first sentence embedding vector by applying a first paraphrased sentence to a machine learning model;
  extracting verification sentences in a first range from the first sentence embedding vector;

comparing the verification sentences to an input sentence to determine a similarity between the first paraphrased sentence and the input sentence; and selectively, based on a result of the determined similarity, outputting the first paraphrased sentence as a final paraphrased sentence similar to the input sentence.

21. The sentence generating method of claim 20, wherein the determining of the similarity of the first paraphrased sentence comprises outputting the first paraphrased sentence as a similar sentence of the input sentence, in response to the input sentence being determined to be among the verification sentences.

22. The sentence generating method of claim 20, wherein the extracting of the verification sentences comprises extracting a verification sentences in a second range expanded from the first range, in response to a number of verification sentences in the first range being less than or equal to a threshold value.

23. The sentence generating method of claim 20, further comprising:

generating a second sentence embedding vector by applying a trained result data of the machine learning model to the input sentence, wherein the determining of the similarity of the first paraphrased sentence comprises extracting a second paraphrased sentence based on the second sentence embedding vector, in response to the input sentence being determined to be absent from the verification sentences.

24. The sentence generating method of claim 23, wherein the determining of the similarity of the first paraphrased sentence comprises:

extracting other verification sentences corresponding to the second paraphrased sentence; and determining a similarity of the second paraphrased sentence to the input sentence based on comparing the other extracted verification sentences to the input sentence.

25. A non-transitory computer-readable storage medium storing instructions that, when executed by a processor, causes the processor to perform the method of claim 20.

* * * * *